United States Patent [19]

Carlebach et al.

[11] Patent Number: 5,473,733
[45] Date of Patent: Dec. 5, 1995

[54] TECHNIQUE FOR GENERATING IMAGE REPRODUCTION

[75] Inventors: Ephraim A. Carlebach, Ra'anana; Moshe Broudo, Holon, both of Israel

[73] Assignee: Scitex Corporation Ltd., Herzliya, Israel

[21] Appl. No.: 947,510

[22] Filed: Sep. 17, 1992

[30] Foreign Application Priority Data

Mar. 25, 1992 [IL] Israel ........................................ 101376
Jun. 21, 1992 [IL] Israel ........................................ 102270

[51] Int. Cl.$^6$ ..................... G06K 15/00; G06K 15/22; H04N 1/40
[52] U.S. Cl. ..................... 395/107; 395/103; 358/298; 358/456
[58] Field of Search ....................... 395/103, 106, 395/107, 108, 132; 358/298, 456, 459

[56] References Cited

U.S. PATENT DOCUMENTS

| | | | |
|---|---|---|---|
| 3,916,096 | 10/1975 | Everett et al. | 358/456 |
| 4,040,094 | 8/1977 | Everett et al. | 358/459 |
| 4,149,183 | 4/1979 | Pellar et al. | 358/534 |
| 4,447,833 | 5/1984 | Sano et al. | 358/298 |
| 4,456,924 | 6/1984 | Rosenfeld | 358/75 |
| 4,714,964 | 12/1987 | Sasaki | 358/298 |
| 4,825,298 | 4/1989 | Ikuta et al. | 358/298 |
| 4,868,587 | 9/1989 | Loce et al. | 346/157 |
| 4,918,622 | 4/1990 | Granger et al. | 364/518 |
| 4,985,779 | 1/1991 | Gall | 358/298 |
| 5,079,721 | 1/1992 | Gershony | 365/132 |
| 5,156,225 | 9/1992 | Kreitman | 358/456 |
| 5,227,895 | 7/1993 | Carlebach | 358/456 |
| 5,299,020 | 3/1994 | Carlebach | 358/298 |

FOREIGN PATENT DOCUMENTS

| | | |
|---|---|---|
| 0292732 | 11/1988 | European Pat. Off. . |
| 0372826 | 6/1990 | European Pat. Off. . |
| 2091518 | 7/1982 | United Kingdom . |
| 2157119 | 10/1985 | United Kingdom . |
| 9203885 | 3/1992 | WIPO . |

*Primary Examiner*—Raymond J. Bayerl
*Assistant Examiner*—Tracy M. Legree
*Attorney, Agent, or Firm*—Ladas & Parry

[57] ABSTRACT

A technique employing a plotter having a beam of variable intensity for generating a screened reproduction of an image including the steps of: providing a representation of an original containing information representing the input density values of the image, storing information in a screen memory and exposing a recording medium to record the screened reproduction of the image, the step of exposing including the step of: employing information stored in the screen memory and information representing the input density values of the image to determine non-arithmetically whether and at what intensity a laser is to be operated to expose the recording medium at a given location.

37 Claims, 19 Drawing Sheets

| 16 | 15 | 13 | 10 | 11 | 13 | 15 | 16 |
|----|----|----|----|----|----|----|----|
| 14 | 9  | 8  | 5  | 6  | 8  | 9  | 14 |
| 12 | 7  | 4  | 2  | 3  | 4  | 7  | 12 |
| 11 | 6  | 3  | 1  | 1  | 2  | 5  | 10 |
| 10 | 5  | 2  | 1  | 1  | 3  | 6  | 11 |
| 12 | 7  | 4  | 3  | 2  | 4  | 7  | 12 |
| 14 | 9  | 8  | 6  | 5  | 8  | 9  | 14 |
| 16 | 15 | 13 | 11 | 10 | 13 | 15 | 16 |

FIG.7A

| 3 | 3 | 3 | 3 | 3 | 3 | 3 | 3 |
|---|---|---|---|---|---|---|---|
| 3 | 2 | 2 | 2 | 2 | 2 | 2 | 3 |
| 3 | 2 | 1 | 1 | 1 | 1 | 2 | 3 |
| 3 | 2 | 1 | 0 | 0 | 1 | 2 | 3 |
| 3 | 2 | 1 | 0 | 0 | 1 | 2 | 3 |
| 3 | 2 | 1 | 1 | 1 | 1 | 2 | 3 |
| 3 | 2 | 2 | 2 | 2 | 2 | 2 | 3 |
| 3 | 3 | 3 | 3 | 3 | 3 | 3 | 3 |

FIG.7B

| INPUT DENSITY | DENSITY RANGE | OPERATING VALUE | MODULATION CONTROL |
|---|---|---|---|
| 0 | 0 | 0 | 0 |
| 1 | 0 | 1 | 0 |
| 2 | 0 | 1 | 1 |
| 3 | 0 | 1 | 2 |
| 4 | 0 | 1 | 3 |
| 5 | 1 | 2 | 0 |
| 6 | 1 | 3 | 0 |
| 7 | 1 | 4 | 0 |
| 8 | 1 | 2 | 1 |
| 9 | 1 | 3 | 1 |
| 10 | 1 | 4 | 1 |
| 11 | 1 | 2 | 2 |
| 12 | 1 | 3 | 2 |
| 13 | 1 | 4 | 2 |
| 14 | 1 | 2 | 3 |
| 15 | 1 | 3 | 3 |
| 16 | 1 | 4 | 3 |
| 17 | 2 | 5 | 0 |
| 18 | 2 | 6 | 0 |
| 19 | 2 | 7 | 0 |
| 20 | 2 | 8 | 0 |
| 21 | 2 | 9 | 0 |
| 22 | 2 | 5 | 1 |
| 23 | 2 | 6 | 1 |
| 24 | 2 | 7 | 1 |
| 25 | 2 | 8 | 1 |
| 26 | 2 | 9 | 1 |
| 27 | 2 | 5 | 2 |
| 28 | 2 | 6 | 2 |
| 29 | 2 | 7 | 2 |
| 30 | 2 | 8 | 2 |
| 31 | 2 | 9 | 2 |
| 32 | 2 | 5 | 3 |
| 33 | 2 | 6 | 3 |
| 34 | 2 | 7 | 3 |
| 35 | 2 | 8 | 3 |
| 36 | 2 | 9 | 3 |

FIG.8A

| INPUT DENSITY | DENSITY RANGE | OPERATING VALUE | MODULATION CONTROL |
|---|---|---|---|
| 37 | 3 | 10 | 0 |
| 38 | 3 | 11 | 0 |
| 39 | 3 | 12 | 0 |
| 40 | 3 | 13 | 0 |
| 41 | 3 | 14 | 0 |
| 42 | 3 | 15 | 0 |
| 43 | 3 | 16 | 0 |
| 44 | 3 | 10 | 1 |
| 45 | 3 | 11 | 1 |
| 46 | 3 | 12 | 1 |
| 47 | 3 | 13 | 1 |
| 48 | 3 | 14 | 1 |
| 49 | 3 | 15 | 1 |
| 50 | 3 | 16 | 1 |
| 51 | 3 | 10 | 2 |
| 52 | 3 | 11 | 2 |
| 53 | 3 | 12 | 2 |
| 54 | 3 | 13 | 2 |
| 55 | 3 | 14 | 2 |
| 56 | 3 | 15 | 2 |
| 57 | 3 | 16 | 2 |
| 58 | 3 | 10 | 3 |
| 59 | 3 | 11 | 3 |
| 60 | 3 | 12 | 3 |
| 61 | 3 | 13 | 3 |
| 62 | 3 | 14 | 3 |
| 63 | 3 | 15 | 3 |
| 64 | 3 | 16 | 3 |

FIG.8B

| RANGE | MOD CONTROL | SCREEN COMP | BEAM RADIUS |
|---|---|---|---|
| DENSITY RANGE = SCREEN RANGE | 0<br>0<br>1<br>1<br>2<br>2<br>3<br>3 | C<D<br>C≥D<br>C<D<br>C≥D<br>C<D<br>C≥D<br>C<D<br>C≥D | 0<br>1/4<br>1/4<br>1/2<br>1/2<br>3/4<br>3/4<br>1 |
| DENSITY RANGE < SCREEN RANGE | X | X | 0 |
| DENSITY RANGE > SCREEN RANGE | X | X | 1 |

FIG.8C

| 65 | 65 | 65 | 65 | 65 | 65 | 65 | 65 |
|----|----|----|----|----|----|----|----|
| 65 | 41 | 40 | 37 | 38 | 40 | 41 | 65 |
| 65 | 39 | 19 | 17 | 18 | 19 | 39 | 65 |
| 65 | 38 | 18 | 5  | 5  | 17 | 37 | 65 |
| 65 | 37 | 17 | 5  | 5  | 18 | 38 | 65 |
| 65 | 39 | 19 | 18 | 17 | 19 | 39 | 65 |
| 65 | 41 | 40 | 38 | 37 | 40 | 41 | 65 |
| 65 | 65 | 65 | 65 | 65 | 65 | 65 | 65 |

FIG. 12A

| 1 | 0 | 0 | 0 | 0 | 0 | 0 | 3 |
|---|---|---|---|---|---|---|---|
| 1 | 1 | 0 | 0 | 0 | 0 | 3 | 3 |
| 1 | 1 | 1 | 0 | 0 | 3 | 3 | 3 |
| 1 | 1 | 1 | 0 | 3 | 3 | 3 | 3 |
| 1 | 1 | 1 | 1 | 2 | 3 | 3 | 3 |
| 1 | 1 | 1 | 2 | 2 | 3 | 3 | 3 |
| 1 | 1 | 2 | 2 | 2 | 2 | 3 | 3 |
| 1 | 2 | 2 | 2 | 2 | 2 | 2 | 3 |

FIG. 12B

| -3/4 | -3/4 | -3/4 | -3/4 | -3/4 | -3/4 | -3/4 | -3/4 |
|------|------|------|------|------|------|------|------|
| -1/2 | -1/2 | -1/2 | -1/2 | -1/2 | -1/2 | -1/2 | -1/2 |
| -1/4 | -1/4 | -1/4 | -1/4 | -1/4 | -1/4 | -1/4 | -1/4 |
| 0 | 0 | 0 | 0 | 0 | 0 | 0 | 0 |
| 0 | 0 | 0 | 0 | 0 | 0 | 0 | 0 |
| 1/4 | 1/4 | 1/4 | 1/4 | 1/4 | 1/4 | 1/4 | 1/4 |
| 1/2 | 1/2 | 1/2 | 1/2 | 1/2 | 1/2 | 1/2 | 1/2 |
| 3/4 | 3/4 | 3/4 | 3/4 | 3/4 | 3/4 | 3/4 | 3/4 |

FIG. 13A

| -3/4 | -1/2 | -1/4 | 0 | 0 | 1/4 | 1/2 | 3/4 |
|------|------|------|---|---|-----|-----|-----|
| -3/4 | -1/2 | -1/4 | 0 | 0 | 1/4 | 1/2 | 3/4 |
| -3/4 | -1/2 | -1/4 | 0 | 0 | 1/4 | 1/2 | 3/4 |
| -3/4 | -1/2 | -1/4 | 0 | 0 | 1/4 | 1/2 | 3/4 |
| -3/4 | -1/2 | -1/4 | 0 | 0 | 1/4 | 1/2 | 3/4 |
| -3/4 | -1/2 | -1/4 | 0 | 0 | 1/4 | 1/2 | 3/4 |
| -3/4 | -1/2 | -1/4 | 0 | 0 | 1/4 | 1/2 | 3/4 |
| -3/4 | -1/2 | -1/4 | 0 | 0 | 1/4 | 1/2 | 3/4 |

FIG. 13B

| 3/4 | 3/4 | 3/4 | 3/4 | 3/4 | 3/4 | 3/4 | 3/4 |
|-----|-----|-----|-----|-----|-----|-----|-----|
| 1/2 | 1/2 | 1/2 | 1/2 | 1/2 | 1/2 | 1/2 | 1/2 |
| 1/4 | 1/4 | 1/4 | 1/4 | 1/4 | 1/4 | 1/4 | 1/4 |
| 0 | 0 | 0 | 0 | 0 | 0 | 0 | 0 |
| 0 | 0 | 0 | 0 | 0 | 0 | 0 | 0 |
| -1/4 | -1/4 | -1/4 | -1/4 | -1/4 | -1/4 | -1/4 | -1/4 |
| -1/2 | -1/2 | -1/2 | -1/2 | -1/2 | -1/2 | -1/2 | -1/2 |
| -3/4 | -3/4 | -3/4 | -3/4 | -3/4 | -3/4 | -3/4 | -3/4 |

FIG. 13C

| 3/4 | 1/2 | 1/4 | 0 | 0 | -1/4 | -1/2 | -3/4 |
|-----|-----|-----|---|---|------|------|------|
| 3/4 | 1/2 | 1/4 | 0 | 0 | -1/4 | -1/2 | -3/4 |
| 3/4 | 1/2 | 1/4 | 0 | 0 | -1/4 | -1/2 | -3/4 |
| 3/4 | 1/2 | 1/4 | 0 | 0 | -1/4 | -1/2 | -3/4 |
| 3/4 | 1/2 | 1/4 | 0 | 0 | -1/4 | -1/2 | -3/4 |
| 3/4 | 1/2 | 1/4 | 0 | 0 | -1/4 | -1/2 | -3/4 |
| 3/4 | 1/2 | 1/4 | 0 | 0 | -1/4 | -1/2 | -3/4 |
| 3/4 | 1/2 | 1/4 | 0 | 0 | -1/4 | -1/2 | -3/4 |

TECHNIQUE FOR GENERATING IMAGE REPRODUCTION

FIELD OF THE INVENTION

The present invention relates to the recording of a halftone picture and more particularly to a method and apparatus for electronic halftone dot generation in image reproduction.

BACKGROUND OF THE INVENTION

Electronic screening for image reproduction is well established in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded with threshold values, defining a cell memory matrix. Input digitized scanned density values of an image, such as a color separation, are compared with the threshold values, cell by cell. The results provide an on/off control input for a laser plotter.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which position is detected by encoders. The film coordinates are in turn supplied to a screen coordinate generator to be converted into virtual screen coordinates (x,y). A beam control signal generator receives the coordinates (x,y) and an image signal corresponding to the position of the exposure beam to output a beam control signal indicating lighting of the exposure beam when one of the coordinates (x,y) is between upper and lower limit values, corresponding to the same, which are previously determined for each combination of the other of the coordinates (x,y) and the density value of the image signal. U.K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

In U.S. Pat. No. 4,918,622 there is described an electronic graphic arts screener in which a three-dimensional memory array is employed for screen dot generation.

U.S. Pat. No. 4,447,833 describes a method for producing a halftone plate in which control of the luminous energy is performed by the sum, the difference, the product or the quotient of a reference value corresponding to the picture signal and a position signal value varied depending on an exposing position in the halftone dot area to be exposed by an exposure light beam. The patent proposes techniques which do not provide accurate control of incremental halftone dot growth. U.S. Pat. No. 4,985,779 describes a method and apparatus for generating halftone images employing a beam of variable intensity. The apparatus and method employs a lookup table that contains, at addressable locations, output data defining the desired intensity of the radiation beam, as a function of input information, including screen memory coordinates and picture intensity data.

SUMMARY OF THE INVENTION

The present invention seeks to provide an improved method and apparatus for generating a screened reproduction of an image, employing a beam of variable intensity.

There is thus provided in accordance with a preferred embodiment of the present invention a technique employing a plotter having a beam of variable intensity for generating a screened reproduction of an image including the steps of:
  providing a representation of an original containing information representing the input density values of the image;
  storing information in a screen memory; and
  exposing a recording medium to record the screened reproduction of the image, the step of exposing including the step of:
    employing information stored in the screen memory and information representing the input density values of the image to determine non-arithmetically whether and at what intensity a laser is to be operated to expose the recording medium at a given location.

In accordance with a preferred embodiment of the present invention, the step of employing information operates in real time.

Additionally in accordance with a preferred embodiment of the present invention, the step of employing information operates during exposure.

Further in accordance with a preferred embodiment of the present invention, the step of employing utilizes a collection of values to determine whether and at what intensity a laser is to be operated to expose the recording medium at a given location.

The values are preferably values representing beam intensities.

Additionally in accordance with one embodiment of the invention a modulation LUT is employed to receive at least the collection of values for governing the operation of the laser.

According to a preferred embodiment of the present invention there is provided apparatus employing a plotter having a beam of variable intensity for generating a screened reproduction of an image including:
  apparatus for providing a representation of an original containing information representing the input density values of the image;
  apparatus for storing information in a screen memory; and
  apparatus for exposing a recording medium to record the screened reproduction of the image, said apparatus for exposing including:
    apparatus for employing information stored in the screen memory and information representing the input density values of the image to determine non-arithmetically whether and at what intensity a laser is to be operated to expose the recording medium at a given location.

Additionally in accordance with a preferred embodiment of the present invention the apparatus for employing information operates in real time.

Further in accordance with a preferred embodiment of the present invention, the apparatus for operates during exposure.

Preferably the apparatus for employing utilizes a collection of values to determine whether and at what intensity a laser is to be operated to expose the recording medium at a given location.

Additionally in accordance with a preferred embodiment of the present invention there is provided a modulation LUT to receive at least the collection of values for governing the operation of the laser. Further in accordance with a preferred embodiment of the present invention there is provided a technique employing a plotter for generating a screened reproduction of an image including the steps of:

providing a representation of an original containing information representing the input density values of the image; and exposing a recording medium to record the screened reproduction of the image, the step of exposing including the steps of: grouping input densities into groups;

thresholding a group of input densities to provide a threshold passage indication;

employing both the threshold passage indication and information derived from the input density to determine how to expose the recording medium at a given location.

In accordance with a preferred embodiment of the invention, the step of grouping comprises grouping input densities into predetermined groups.

Additionally in accordance with a preferred embodiment of the present invention, the step of grouping comprises employing a single operating value to represent a multiplicity of input densities and the step of thresholding comprises thresholding the operating value to provide the threshold passage indication.

Additionally in accordance with a preferred embodiment of the present invention, the step of grouping comprises the step of mapping a plurality of input densities into an operating value and the step of thresholding comprises the step of operating with a threshold on the operating value to provide the threshold passage indication.

BRIEF DESCRIPTION OF THE DRAWINGS

The present invention will be more fully understood and appreciated from the following detailed description, taken in conjunction with the drawings in which:

FIGS. 7A and 7B are illustrations of a typical arrangement of two screen memory outputs in accordance with a preferred embodiment of the present invention;

FIGS. 8A and 8B are illustrations of typical contents of an input LUT employed in the apparatus of the present invention;

FIG. 8C illustrates the functionality of a modulation LUT employed in the apparatus of the present invention;

FIGS. 12A and 12B are illustrations of a typical arrangement of two additional screen memory outputs in accordance with a preferred embodiment of the present invention;

FIGS. 13A, 13B, 13C and 13D are illustrations of a typical arrangement of the contents of a correction LUT employed in the apparatus of FIG. 11;

DETAILED DESCRIPTION OF A PREFERRED EMBODIMENT

Figure 1:
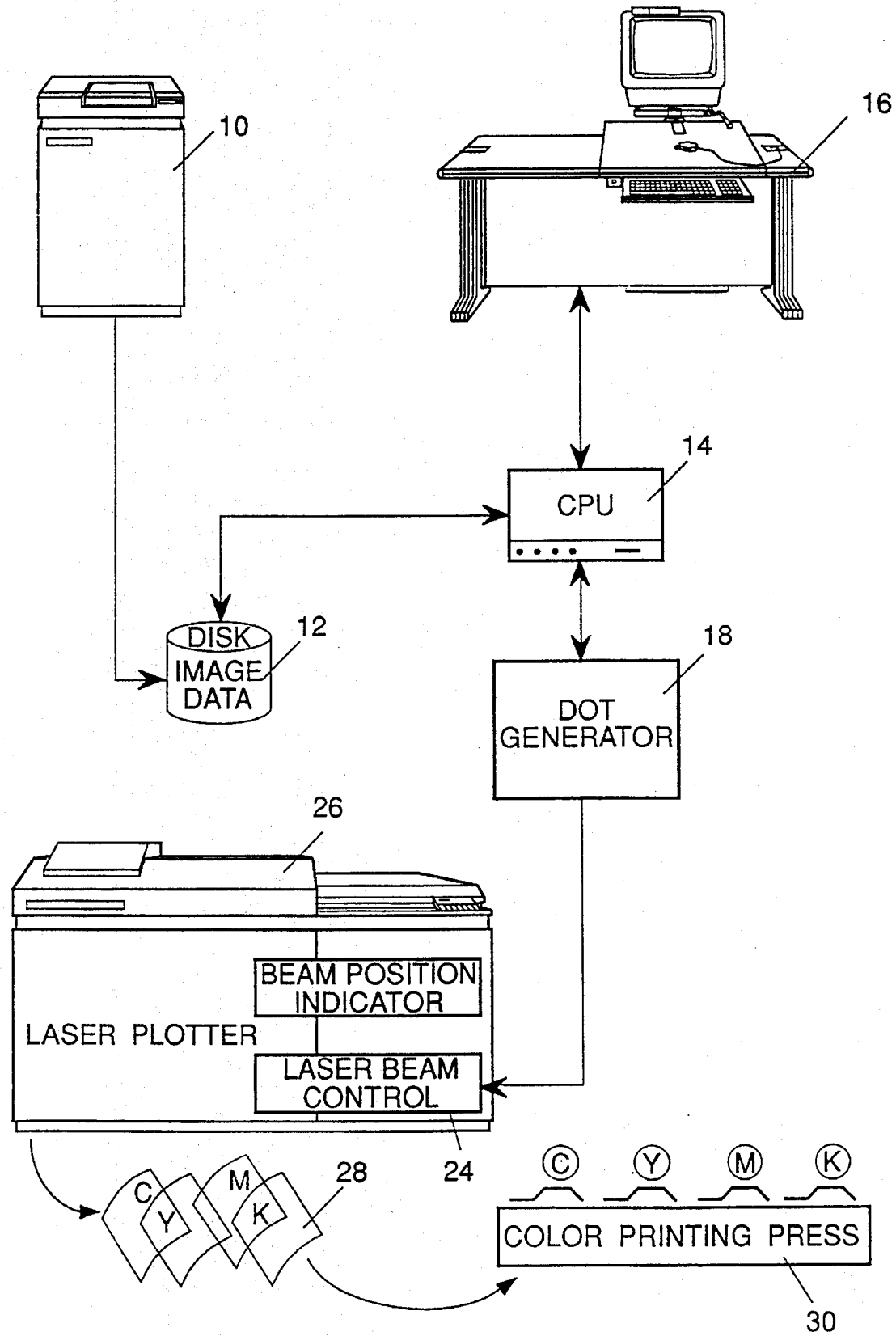
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel 80486. Interfacing with the CPU 14 is an interactive workstation 16, such as a Scitex Prisma, manufactured and sold by Scitex Corporation Ltd. of Herzlia, Israel.

CPU 14 also interfaces with screen processor circuitry 18 which provides a control output to laser beam control circuitry 24 in a laser plotter 26, such as a Raystar, manufactured and sold by Scitex Corporation Ltd. of Herzlia, Israel. The laser plotter 26 includes beam position indicator apparatus 27, which provides an output to screen processor 18.

Laser plotter 26 produces halftone film color separations 28 which are employed in a conventional process color printing press 30, to produce process color prints.

The structure and operation of screen control circuitry 18 are illustrated in greater detail in FIGS. 6–14 and will be described hereinbelow.

Figure 2:
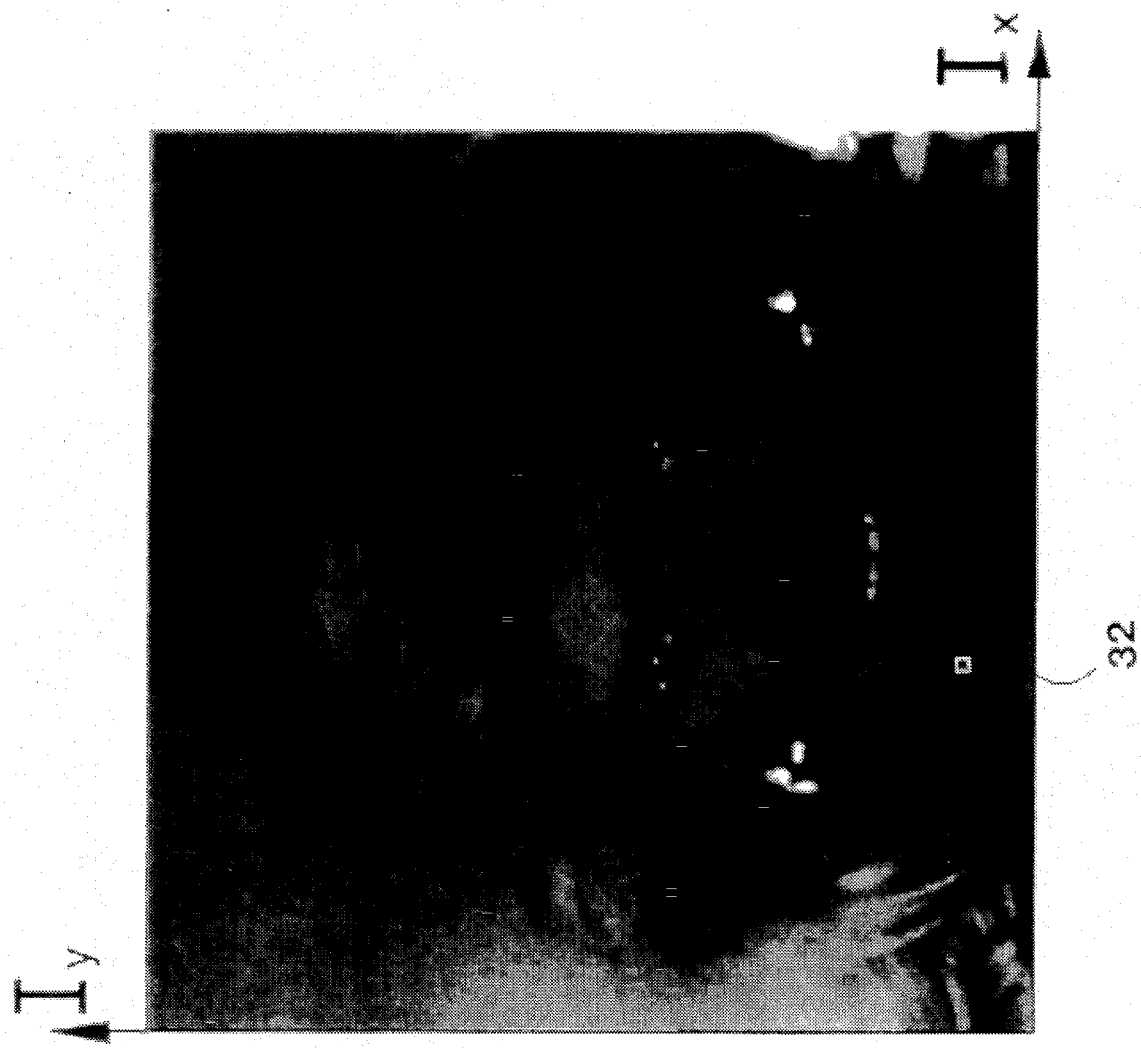
FIG. 2 is an illustration of a typical halftone color separation.
Figure 3:
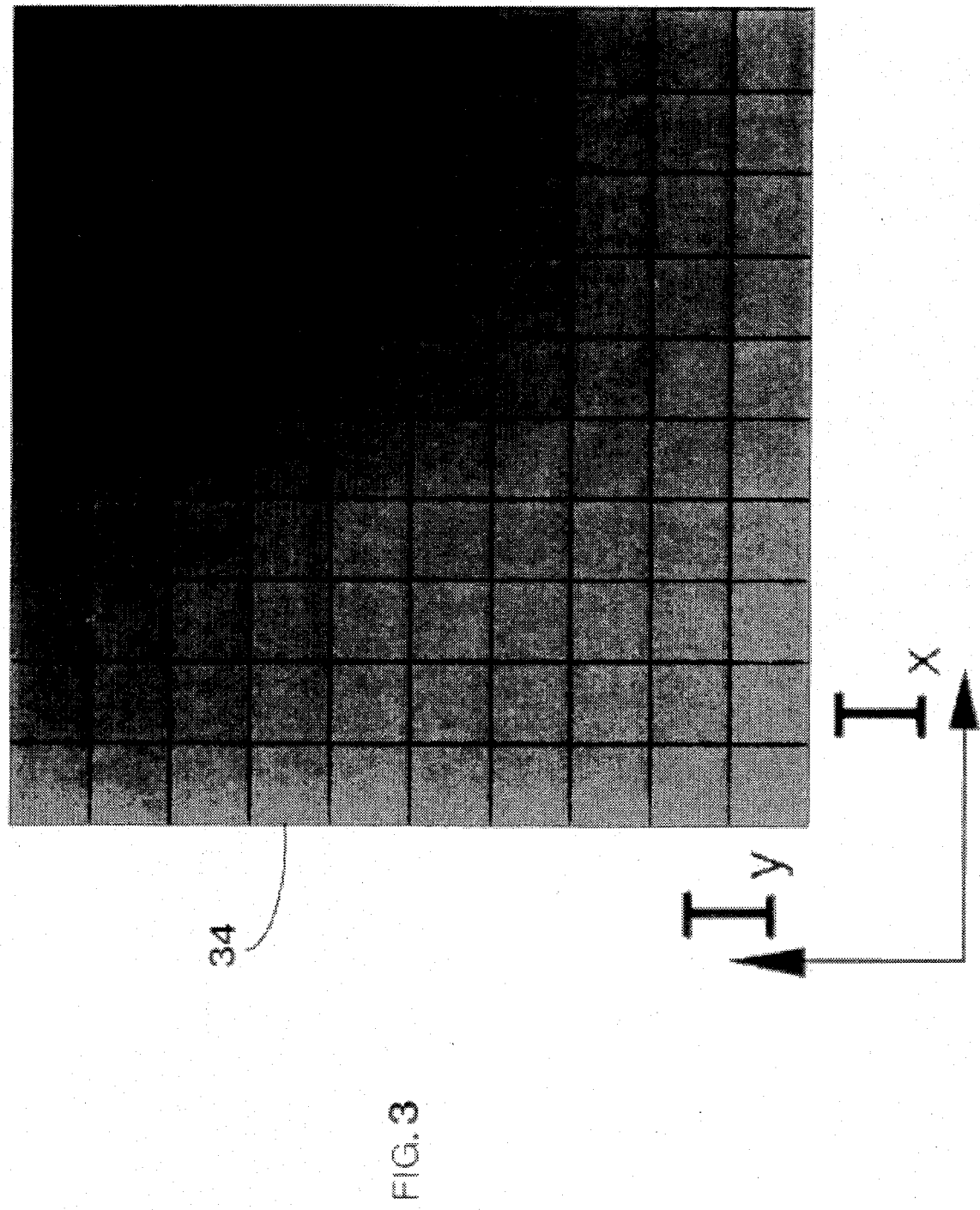
FIG. 3 is an enlarged illustration of a small portion of the halftone color separation of FIG. 2.

Reference is now made to FIGS. 2 and 3. FIG. 2 illustrates a typical halftone color separation which is stored on disk 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinates Ix and Iy. Pixels 34 typically have a resolution of 100–400 pixels per inch along each of the coordinate axes of the input image.

Figure 4:
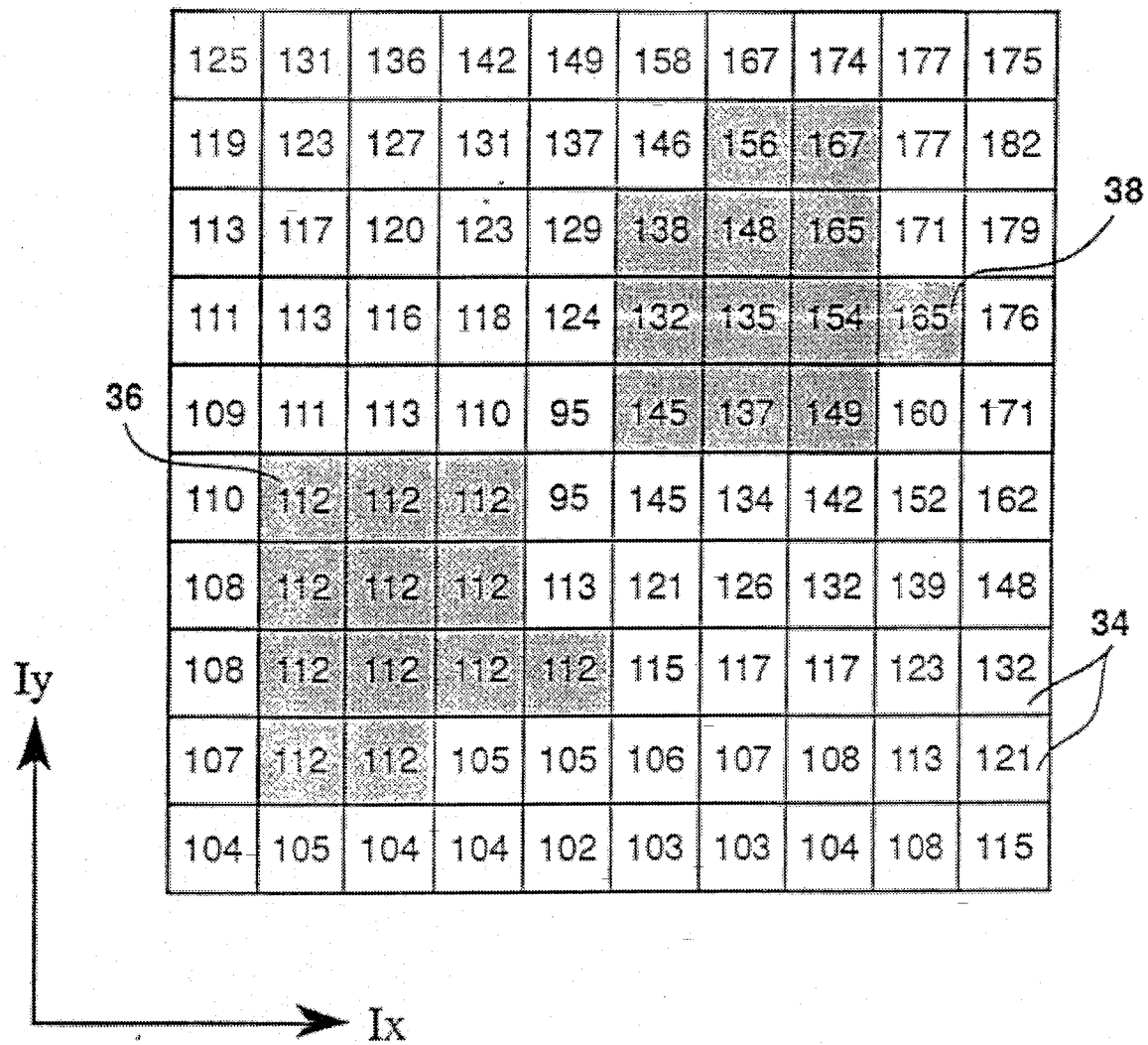
FIG. 4 is an illustration of pixel-by-pixel input density values for the small portion of the color separation shown in FIG. 3.

Each average gray level for a pixel 34 is represented digitally by an input density level. There are typically provided 256 different input density levels, D being the lightest and 255 being the blackest. For simplicity in the examples which follow, 64 different input density levels are employed. FIG. 4 illustrates the input density values for the pixels 34 of FIG. 3.

Figure 5:
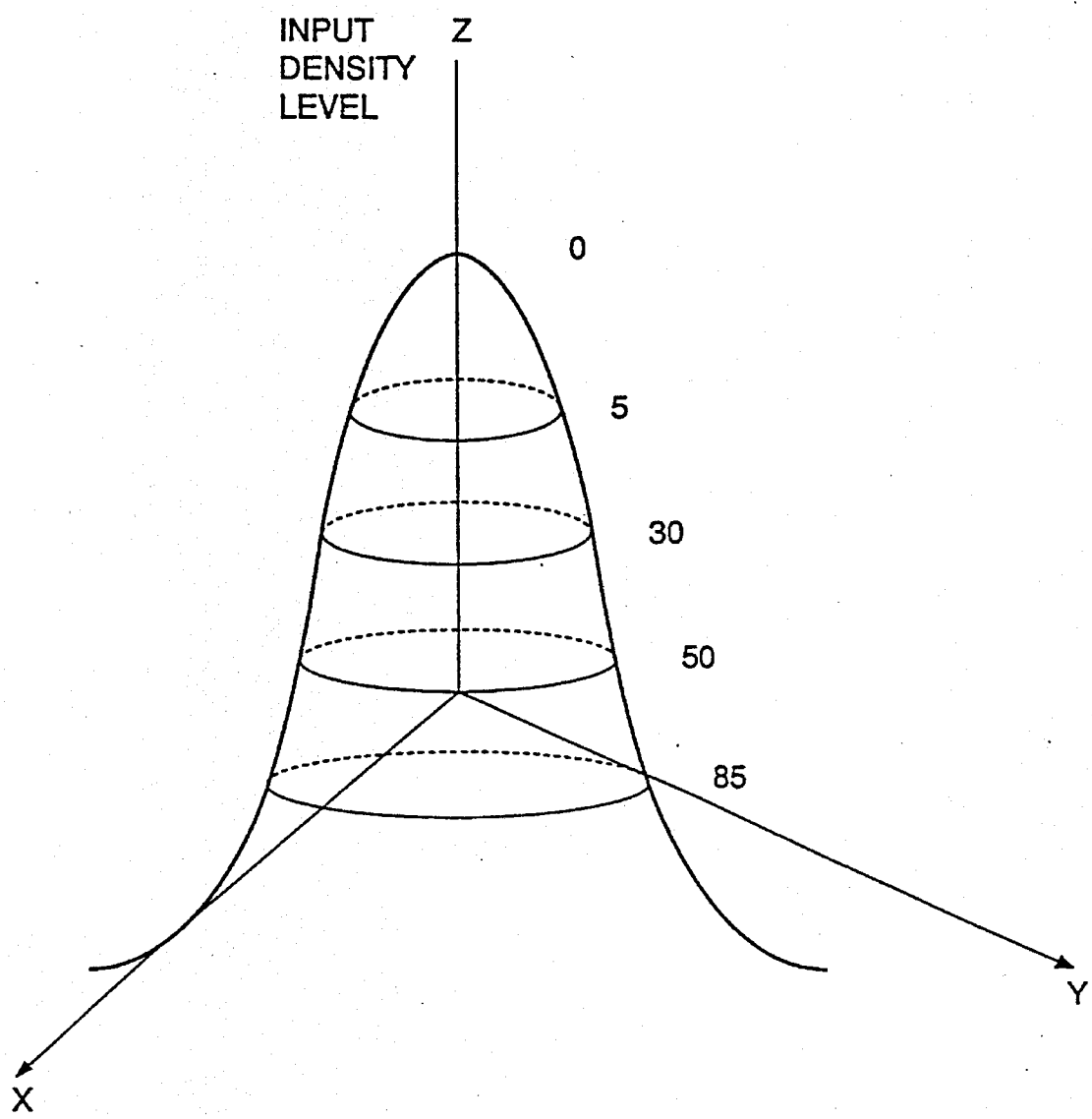
FIG. 5 is an illustration of the derivation of printing dots from a density distribution for a given printing dot configuration.

FIG. 5 illustrates a density distribution for a typical dot, which is used in process color printing. FIG. 5 shows various cross-sections of the density distribution for various corresponding input density values, the plurality of cross-sections defining the printing dot configuration.

Figure 6:
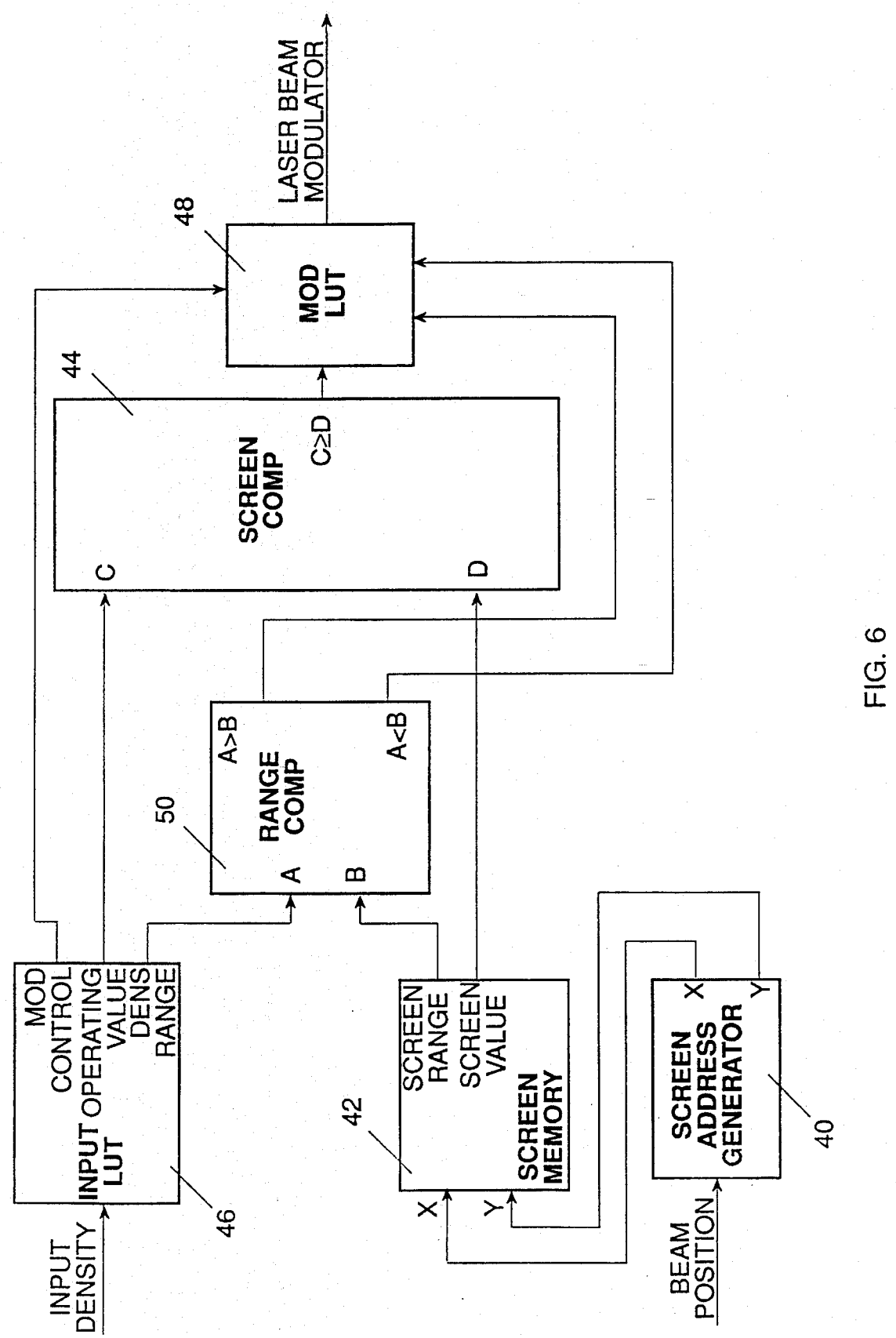
FIG. 6 is a generalized block diagram illustration of apparatus for screen generation in accordance with a preferred embodiment of the present invention.

Reference is now made to FIG. 6, which illustrates, in generalized block diagram form, apparatus for screen generation in accordance with a preferred embodiment of the present invention. A beam position indication input is received from beam position indicator 27 (FIG. 1) at screen address generator apparatus 40, which preferably includes coordinate transformation apparatus. The coordinate transformation apparatus is operative to calculate X and Y screen coordinates for each beam position location.

The X and Y screen coordinates are supplied to a screen memory 42. A screen value output of screen memory 42 is supplied to a screen comparator circuit 44, which also receives an operating value input from an input LUT 46. LUT 46 receives an input density map of an original from CPU 14 (FIG. 1). A typical screen value output configuration appears in FIG. 7A.

The input LUT 46 is also operative to provide a modulation control output to a modulation LUT 48 and a density range output to a range comparator 50. The contents of input LUT 46, in accordance with a preferred embodiment of the invention, are shown in FIGS. 8A and 8B.

The screen comparator 44 is operative in real time to provide an output to the modulation LUT 48, indicating whether the input received from the input LUT 46 is greater than or equal to the screen value output of screen memory 42.

The range comparator 50 also receives a screen range input from screen memory 42 and is operative to provide one of two outputs to the modulation LUT 48, indicating which of its two inputs is greater or if they are both equal. A typical screen range configuration is illustrated in FIG. 7B.

The functionality of the modulation LUT 48, in accordance with a preferred embodiment of the present invention, is illustrated in FIG. 8C. It is to be appreciated that the laser beam radii shown in FIG. 8C are produced by the laser beam intensities determined by the modulation LUT 48 and are exemplary only and are not to be considered limiting in terms of the relationship between radii or the absolute radii. The operation of the apparatus of FIG. 6 will now be described: Generally speaking, the embodiment of FIG. 6 represents apparatus and a technique employing a plotter for generating a screened reproduction of an image including the steps of:

providing a representation of an original containing input density information representing the input density values of the image;

storing screen memory information in a screen memory; and exposing a recording medium to record the screened reproduction of the image, the step of exposing including the steps of:

employing the input density information to distinguish between a central region of a printing dot and a peripheral region thereof; and determining whether and where a recording medium is exposed using the input density information and the screen memory information and applying thereto different criteria for the central region and the peripheral region.

In the embodiment of FIG. 6, the region where a recording medium of given sensitivity is exposed by the laser is determined by the location of the laser relative to the recording medium at the time of exposure and by selection of the intensity of the laser beam during exposure.

The range comparator 50 is operative to distinguish between the central region and peripheral region of a printing dot and a region outside the dot by comparing a density range output from input LUT 46 with a screen range input received from the screen memory 42. The density range represents a grouping of input density values. The screen range input received from the screen memory 42 defines the general pattern of growth of the dot.

If one views the printing dot as a collection of generally concentric complete or partial rings about the dot center, it can be said that each screen range represents the configuration of a given ring, while the density range represents the general location of the periphery of the dot representing a given input density.

The outputs of the range comparator 50 indicate whether the general location of the periphery of the dot lies entirely exterior of a given ring, or whether the given ring lies entirely exterior of the general location of the periphery or whether neither of the above conditions applies.

As can be understood from FIG. 8C, if A<B, i.e. the density range is less than the screen range, the laser intensity will always be 0, i.e. the laser is not operated, since it is clear that the dot periphery does not extend to the given ring.

Similarly, if A>B, i.e. the density range is greater than the screen range, the laser intensity will always be 1, i.e. the laser is operated at its standard intensity, since it is clear that the dot periphery lies entirely beyond the given ring. For the purposes of the present invention, the region of the dot wherein A>B is considered to be the central region.

In both of the foregoing cases, the output of the screen comparator is irrelevant.

In the peripheral region of the dot, where A=B, the dot is defined not only by the presence or absence of dot elements produced by operating the laser at its standard intensity, (hereinafter "standard intensity dot elements") but also by variation in the intensity at which the laser is operated to produce the individual dot elements. For the purposes of the present invention, the region of the dot wherein A=B is considered to be the peripheral region.

Variation in the laser intensity employed in exposure of the individual dot elements in the peripheral region is achieved in accordance with a preferred embodiment of the present invention by employing screen comparator 44 which receives the respective operating value output of input LUT 46 and the screen value output of screen memory 42 at respective inputs C and D.

The screen value output defines a threshold value between two intensity values, which are in turn selected by a modulation control output from the input LUT 46. Generally, each operating value is a representation of a plurality of input density values, each corresponding to a different modulation control output value.

Thus, each combination of an operating value and a modulation control value uniquely represents a given input density.

Accordingly, the screen comparator 44 provides an output to modulation LUT 48 when $C \geq D$ indicating that the operating value equals or exceeds a given threshold defined by the screen memory 42. The modulation control signal from input LUT 46 defines which intensity level is employed as the result of meeting or exceedence of the threshold and which intensity level is employed as the result of failure to meet the threshold.

Accordingly in the illustrated embodiment of the invention the modulation LUT outputs a control value to produce the appropriate laser beam radius as indicated in FIG. 8C and causes the laser to operate at one of five intensity levels between 0 and 1, i.e. between being turned off and standard intensity.

Figure 9A:
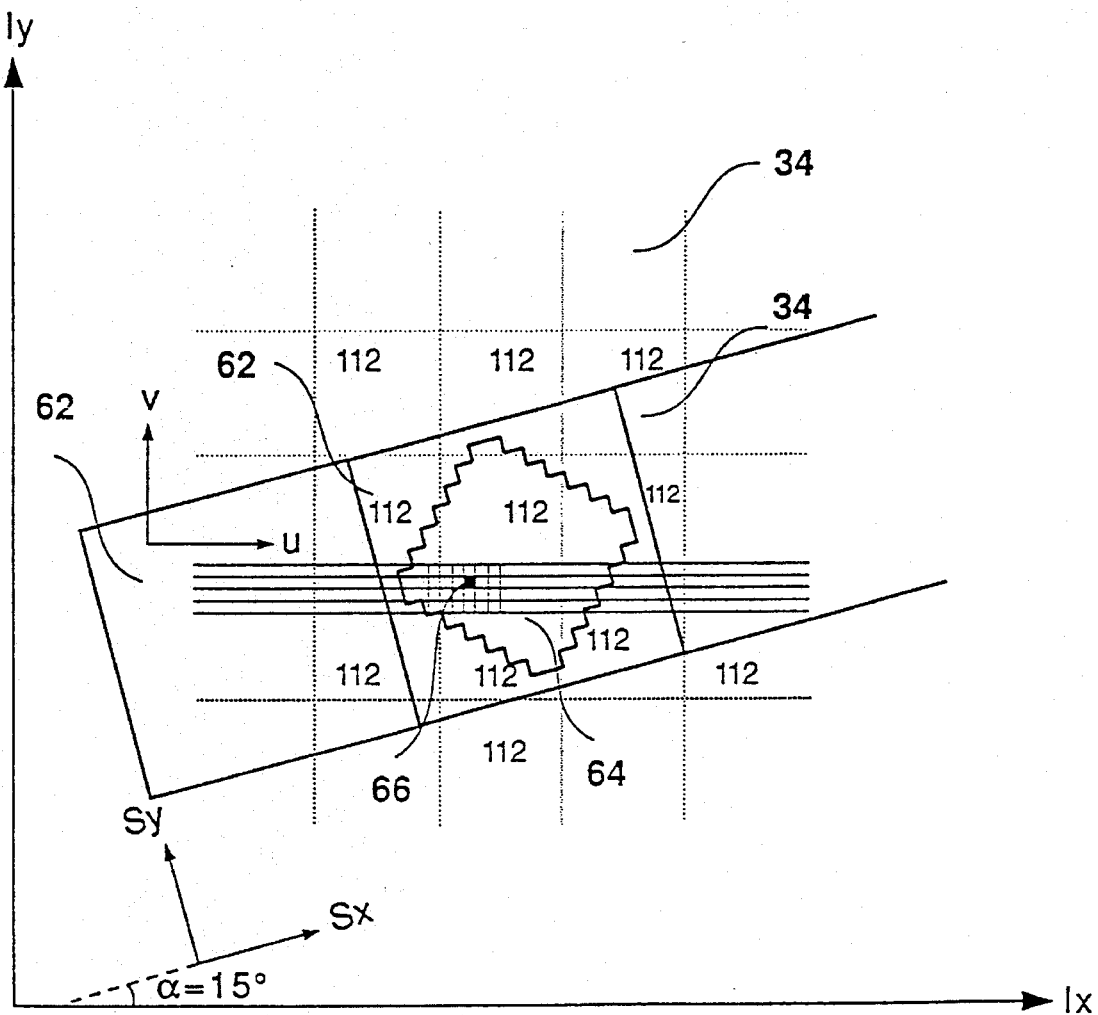
FIGS. 9A, 9B and 9C illustrate the construction of a printing dot using a laser plotter in accordance with the present invention.

Reference is now made to FIG. 9A, which illustrates the construction of a printing dot employing a rotated screen having a mesh different from the resolution of the scanner 10, for a portion 36 of the image illustrated in FIGS. 3 and 4. The input density values for the pixels 34 are indicated within each pixel and it is seen that they are all uniform.

The rotated screen defines a second multiplicity of printing dot cells 62, lying along coordinate axes Sx, Sy, which are rotated with respect to coordinate axes Ix, Iy by a given angle, typically 15 degrees. Each printing dot 64 is located within a printing dot cell 62. The mesh of the rotated screen defines the size of cells 62 and provides printing dots having a typical spatial frequency of 60–200 per inch in the output image.

Each output dot 64 is made up of a third multiplicity of printing dot elements 66 which normally have a significantly higher resolution than pixels 34 and which are produced by laser plotter 26 (FIG. 1), which operates along coordinates u, v, which are normally parallel to coordinates Ix, Iy. Typical resolution of printing dot elements 66 is 600–5000 per inch of the output image.

Figure 9B:
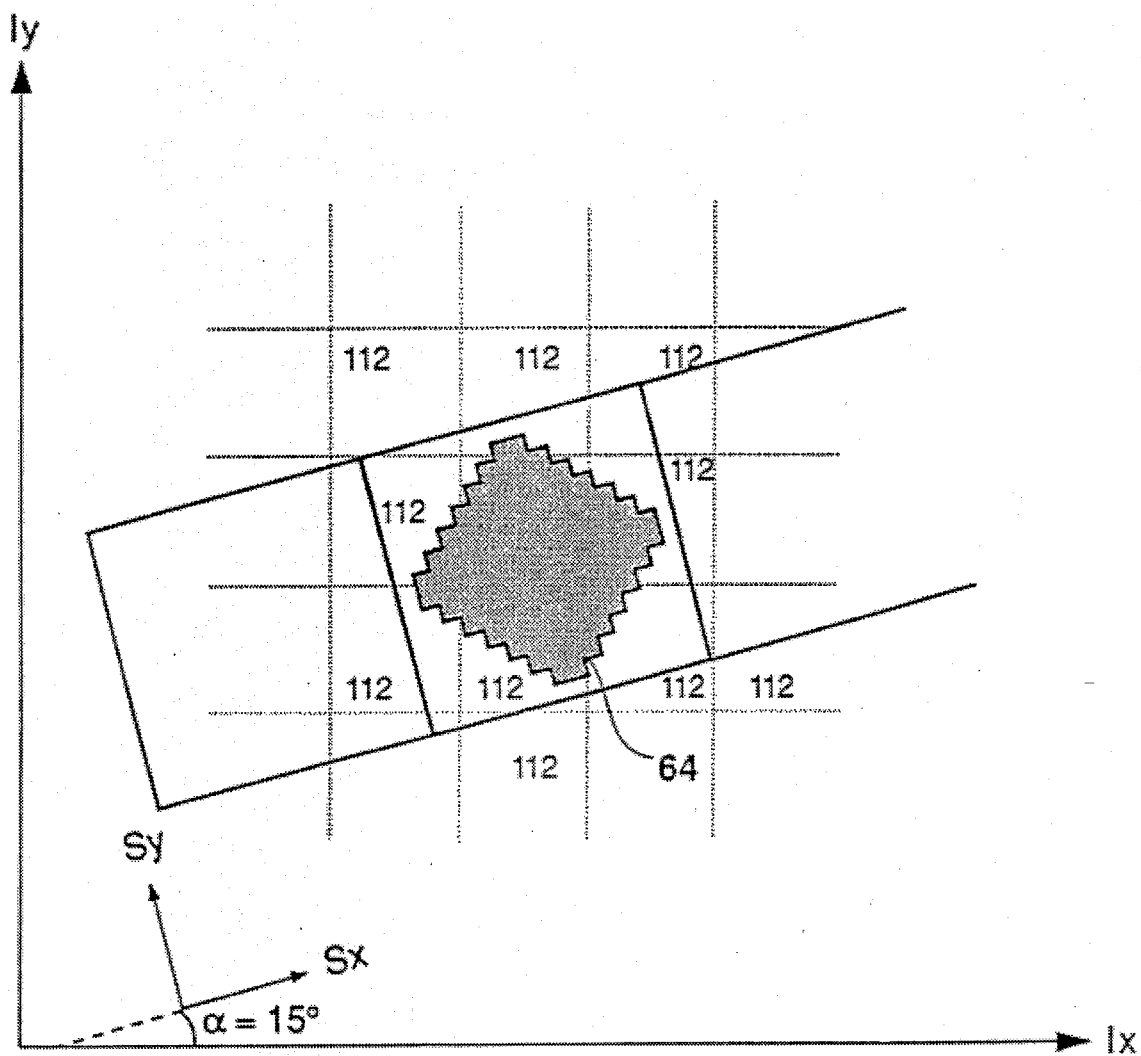

FIG. 9B illustrates a completed printing dot produced by the technique described above for the same location on the input image.

Figure 9C:
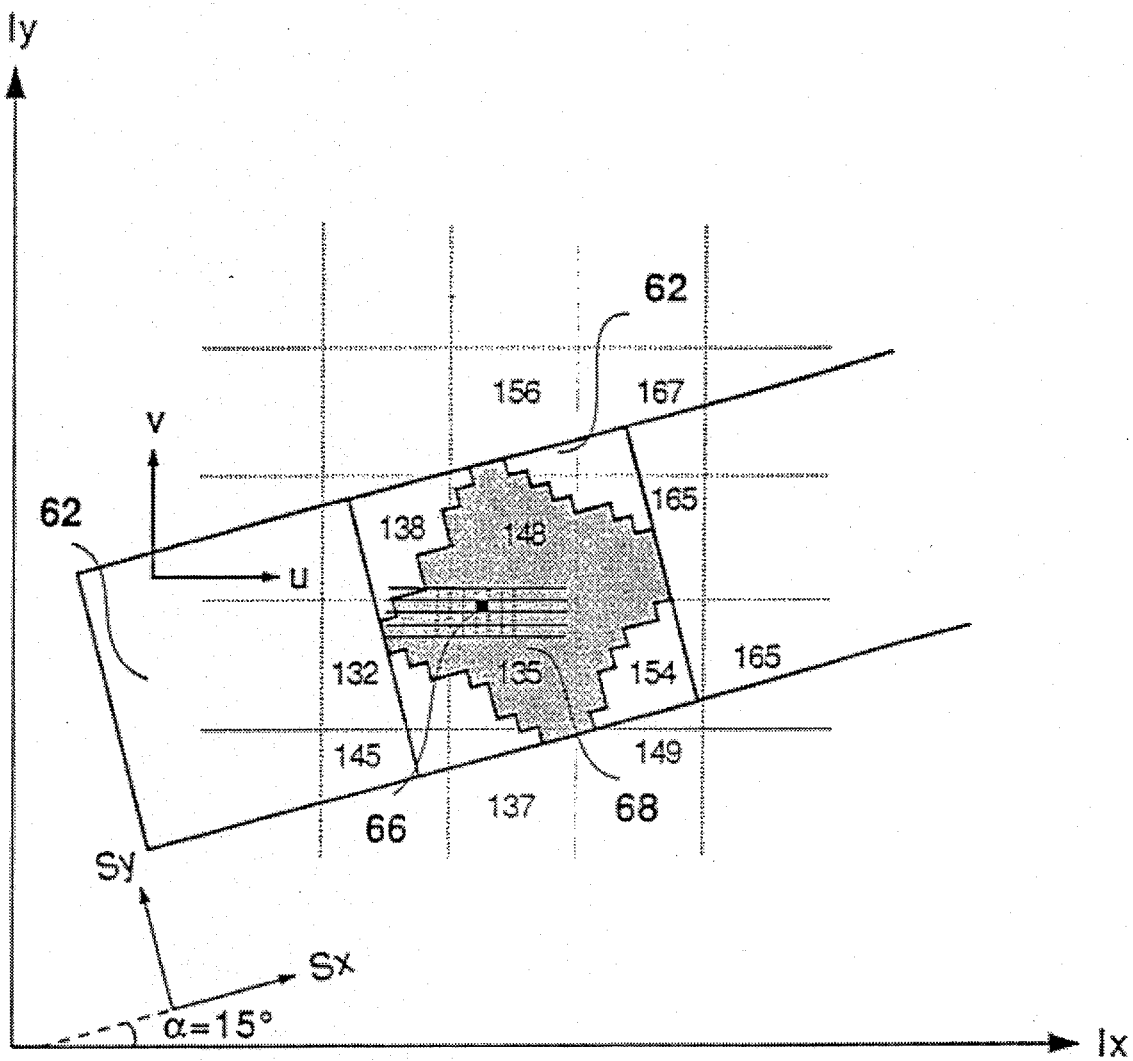

Reference is now made to FIG. 9C, which illustrates the construction of a printing dot employing a rotated screen having a mesh different from the resolution of the scanner 10, for a portion 38 of the image illustrated in FIGS. 3 and 4. The input density values for the pixels 34 are indicated within each pixel and it is seen that they differ from each other.

As in the example of FIGS. 9A and 9B, the rotated screen defines a second multiplicity of printing dot cells 62 lying along coordinate axes Sx, Sy, which are rotated with respect to coordinate axes Ix, Iy by a given screen rotation angle, typically 15 degrees. Each printing dot 68 is located within a printing dot cell 62. The mesh of the rotated screen defines the size of cells 62 and provides printing dots having a typical spatial frequency of 60–200 per inch in the output image.

It is appreciated from a consideration of FIG. 9C, that each part of the printing dot is a function of the input density value of the pixel 34 at the location at which that part lies. Thus where the input density value is relatively low, such as 132, the number of printing dot elements is generally relatively small, and where the input density value is high, such as 165, the number of printing dot elements is generally relatively large. A printing dot which overlies pixels 34 having different input density values is thus configured in a manner generally corresponding to the arrangement of the input density values of the pixels 34 represented by the printing dot.

Figure 10:
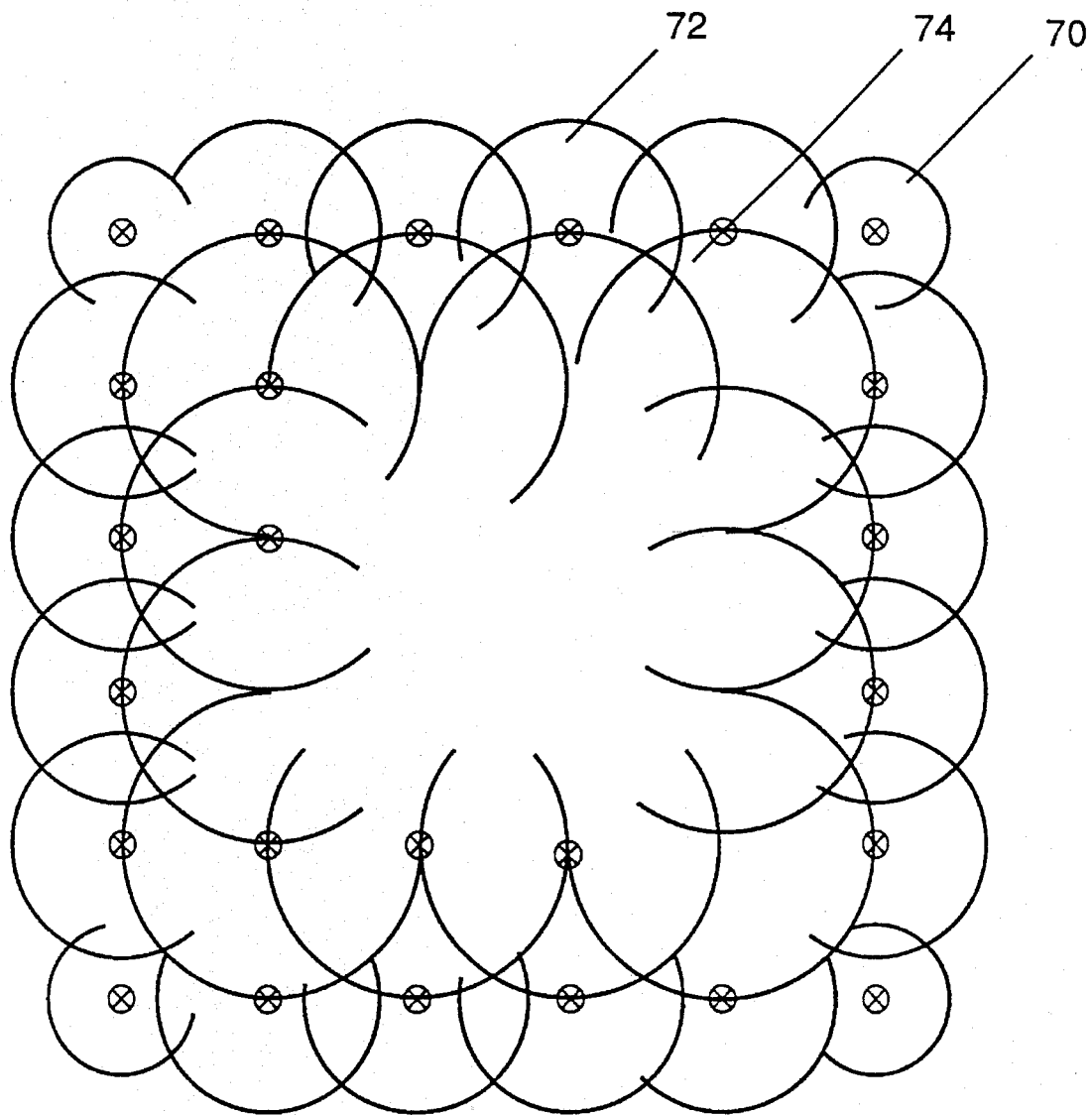
FIG. 10 is an illustration of a printing dot created using the screen memory outputs of FIGS. 7A and 7B, the input LUT contents of FIGS. 8A and 8B and the modulation LUT whose functionality is illustrated in FIG. 8C.

A printing dot having an input density of 30 and created using the screen memory outputs of FIGS. 7A and 7B, the input LUT contents of FIGS. 8A and 8B and the modulation LUT whose functionality is illustrated in FIG. 8C, is shown in FIG. 10. At the interior of the printing dot there are seen a plurality of standard intensity printing dot elements 74, represented in the table of FIG. 8C as laser beam radius "1".

Disposed in partially overlapping orientation with dots 74 along the periphery of the printing dot are a line of printing dot elements 72 of intensity lower than the standard intensity. In the example provided according to FIG. 8C, the radius of printing dot elements 72 is ¾ of that of the standard intensity dot elements.

Figure 11:
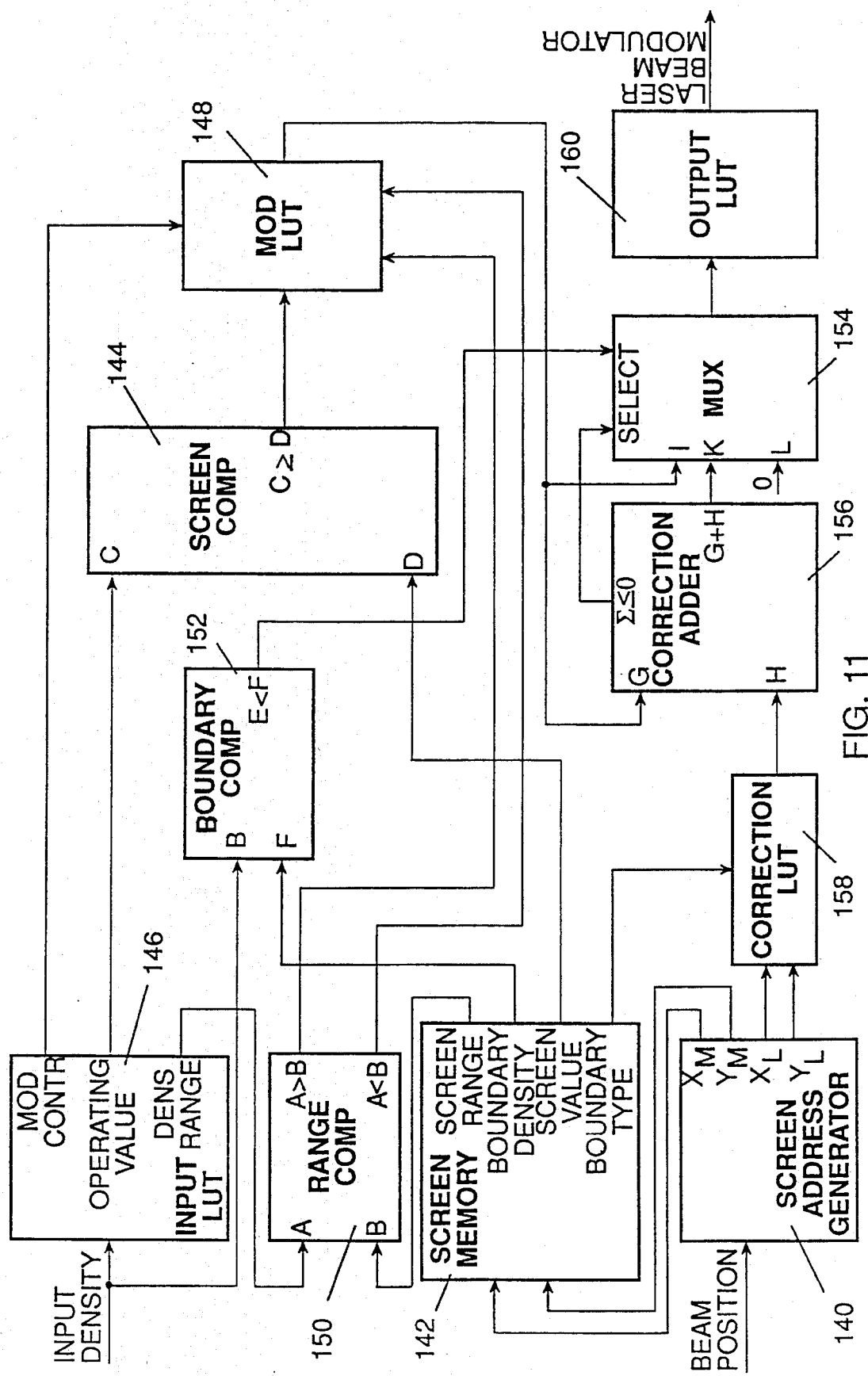
FIG. 11 is a generalized block diagram illustration of apparatus for screen generation in accordance with another preferred embodiment of the present invention.

Arranged at the four corners of the printing dot in partially overlapping orientation with dot elements 74 and 72 are printing dot elements 70 of intensity which is lower than that of printing dot elements 72. In the example provided according to FIG. 8C, the radius of printing dot elements 70 is one-half of that of the standard intensity dot elements. Reference is now made to FIG. 11, which illustrates apparatus for screen generation in accordance with another preferred embodiment of the present invention. A beam position indication input is received from beam position indicator 27 (FIG. 1) at screen address generator apparatus 140, which preferably includes coordinate transformation apparatus. The coordinate transformation apparatus is operative to calculate X and Y screen coordinates for each beam position location. The screen address generator apparatus 140 is operative to provide $X_M$ and $Y_M$ outputs representing the most significant bits of the X and Y screen coordinates. These outputs represent the screen address and identify a screen element in the screen memory.

The screen address generator apparatus 140 also provides $X_L$ and $Y_L$ outputs representing the remaining bits of the X and Y screen coordinates. These outputs identify a location within a given screen element.

The $X_M$ and $Y_M$ outputs are supplied to a screen memory 142. A screen value output of screen memory 142 is supplied to a screen comparator circuit 144, which also receives an operating value input from an input LUT 146. LUT 146 receives an input density map of an original from CPU 14 (FIG. 1). A typical screen value output configuration appears in FIG. 7A.

The input LUT 146 is also operative to provide a modulation control output to a modulation LUT 148 and a density range output to a range comparator 150. The contents of input LUT 146, in accordance with a preferred embodiment of the invention, are shown in FIGS. 8A and 8B.

The screen comparator 144 is operative in real time to provide an output to the modulation LUT 148, indicating whether the input received from the input LUT 146 is greater than or equal to the screen value output of screen memory 142.

The functionality of the modulation LUT 148, in accordance with a preferred embodiment of the present invention, is illustrated in FIG. 8C.

A boundary comparator 152 receives an input density map of an original from CPU 14 (FIG. 1) and a second input from a boundary density output of screen memory 142. A typical arrangement of the boundary density output is illustrated in FIG. 12A. The boundary comparator 152 provides an output, indicating which of the two inputs is greater, to a multiplexer 154.

Multiplexer 154 receives a first input from the modulation LUT 148 and a second input from a correction adder 156. A third input is set to zero.

Correction adder 156 receives a first input from the modulation LUT 148 and a second input from a correction LUT 158. Correction LUT 158 receives the $X_L$ and $Y_L$ outputs from screen address generator 140 as well as a boundary type input from screen memory 142. A typical arrangement of the boundary type input is illustrated in FIG. 12B.

The output of multiplexer 154 is supplied via an output LUT 160 to a laser beam modulator incorporated in laser beam control apparatus 24 (FIG. 1). Output LUT 160 converts radius information into intensity information.

The apparatus of FIG. 11 operates similarly to the apparatus of FIG. 6, as described hereinabove with the following general difference. The apparatus of FIG. 11 takes into account the effects of non-registration between the grid of laser beam locations and that of screen elements. As a result of the inevitable truncation involved in defining a screen memory address, a range of laser beam locations maps into each screen element. The non-registration may cause this mapping to result in distortion of the dot shape.

The apparatus of FIG. 11 attempts to maintain the desired outer envelope of the dot shape irrespective of variations in the relative positions of the laser beam exposure locations with respect to the screen elements.

This is done by employing boundary comparator 152 to determine whether the laser beam location is at the boundary of the dot for a given input density. When the laser beam location is found not to be at the boundary of the dot, no intensity correction is made, and the output of modulation LUT 148 is transferred directly via the I input of multiplexer 154 and output LUT 160 to the laser beam modulator in laser beam control circuitry 24 (FIG. 1).

When the laser beam location is found to be at the boundary of the dot, the correction LUT 158 employs $X_L$ and $Y_L$ outputs to provide a laser beam radius correction value in accordance with the boundary type information received from the screen memory 142. These correction values are set forth, exemplarily in FIGS. 13A–13D. Each matrix shown in FIGS. 13A–13D relates to a multiplicity of locations within a given screen element at a dot boundary.

In the preferred embodiment of the invention illustrated herein, there are four boundary types, indicated, as follows

| BOUNDARY TYPE | CHARACTERISTIC |
| --- | --- |
| 0 | TOP BOUNDARY |
| 1 | LEFT BOUNDARY |
| 2 | BOTTOM BOUNDARY |
| 3 | RIGHT BOUNDARY |

As can be seen from an examination of the contents of correction LUT 158 shown in FIGS. 13A–13D, a laser beam radius correction, is provided for different locations on the dot boundary according to the boundary type. Thus, for example, for a boundary type 0, i.e. top boundary, the correction LUT output shown in FIG. 13A, provides a negative correction for laser beam locations at the top boundary of a screen element and a positive correction for laser beam locations at the bottom of the screen element.

The correction mandated by the correction LUT 158 is added to the radius output of the modulation LUT 148 by correction adder 156. If the result is less than or equal to zero, no exposure takes place. Otherwise, the radius output information from correction adder 156 is supplied by multiplexer 154, via output LUT 160 to the laser beam modulator of laser beam control circuitry 24 (FIG. 1).

Figure 14:
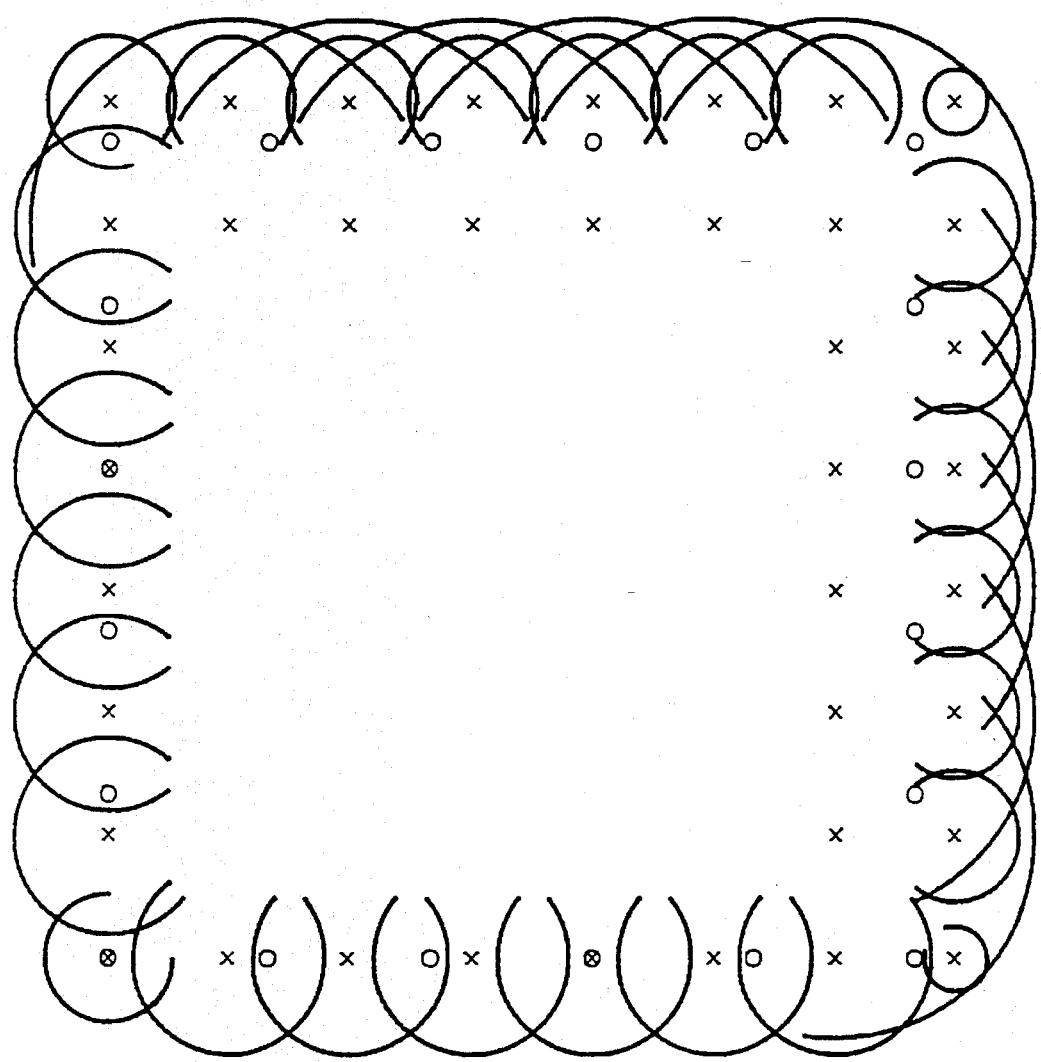
FIG. 14 is an illustration of a printing dot created using the screen memory outputs of FIGS. 7A and 7B, the input LUT contents of FIGS. 8A and 8B and the modulation LUT whose functionality is illustrated in FIG. 8C as well as the screen memory outputs of FIGS. 12A and 12B and the LUT contents of FIGS. 13A–13D.

A printing dot having an input density of 30 and created by the apparatus of FIG. 11, using the screen memory outputs of FIGS. 7A, 7B, 12A and 12B, the input LUT contents of FIGS. 8A and 8B, the correction LUT contents of FIGS. 13A–13D and the modulation LUT whose functionality is illustrated in FIG. 8C, is shown in FIG. 14. Comparing this dot with that shown in FIG. 10, it is noted that while in the dot of FIG. 10, the dot elements are each aligned with the screen elements, this is not the case in the dot of FIG. 14.

In order that this feature can be better appreciated, the dot of FIG. 14 is constructed with a higher recording resolution than that of the dot of FIG. 10, but with the same screen mesh as that of FIG. 10. Due to the higher resolution, in view of the desire to maintain a standard 50% overlap between standard intensity dot elements, the standard intensity dot element in the dot of FIG. 14 is smaller than the corresponding standard intensity dot element in the dot of FIG. 10. The same proportionality is true for the remaining dot elements as well.

In the dot of FIG. 14, the centers of each screen element are designated by "o" and the centers of each dot element are designated by "x", thus indicating the offsets therebetween. In the dot of FIG. 10, the same notation is employed and it can be seen that the center of each screen element is located at exactly the same location as that of each dot element.

It is noted that at the lower left hand corner of the dot of FIG. 14, the centers of the dot element and the screen element are aligned. Horizontal alignment of the centers of the dot element and the screen element is maintained all along the left hand edge of the dot. Vertical alignment of the centers of the dot element and the screen element is maintained all along the bottom edge of the dot. Accordingly, along these edges, the dot of FIG. 14 is built exactly like the dot of FIG. 10, except for the difference in resolution.

At the top edge of the dot of FIG. 14, there exists both vertical and horizontal non-alignment between the centers of the dot elements and of the corresponding screen elements. In accordance with a preferred embodiment of the invention, employing the apparatus of FIG. 11, the intensities of the laser beams which are used to expose the dot elements along the top boundary of the dot, and thus the radii of the dot elements are varied so as to minimize the extent to which they undesirably extend beyond the top boundary.

Referring to FIG. 13A, which contains the correction values for a top boundary, it can be seen that the amount of correction is dependent only on the amount of vertical nonalignment.

At the right edge of the dot of FIG. 14, there exists both horizontal and vertical non-alignment between the centers of the dot elements and of the corresponding screen elements. In accordance with a preferred embodiment of the invention, employing the apparatus of FIG. 11, the intensities of the laser beams which are used to expose the dot elements along the right hand boundary of the dot, and thus the radii of the dot elements are varied so as to minimize the extent to which they undesirably extend beyond the right boundary. Referring to FIG. 13D, which contains the correction values fop a right hand boundary, it can be seen that the amount of correction is dependent only on the amount of horizontal nonalignment.

It is appreciated that in the generation of a dot, multiple laser beam exposures may define a single dot element. The correction to the intensity of each exposure is a function of the horizontal or vertical offset between the centers of the corresponding screen element and dot element.

Figure 15:
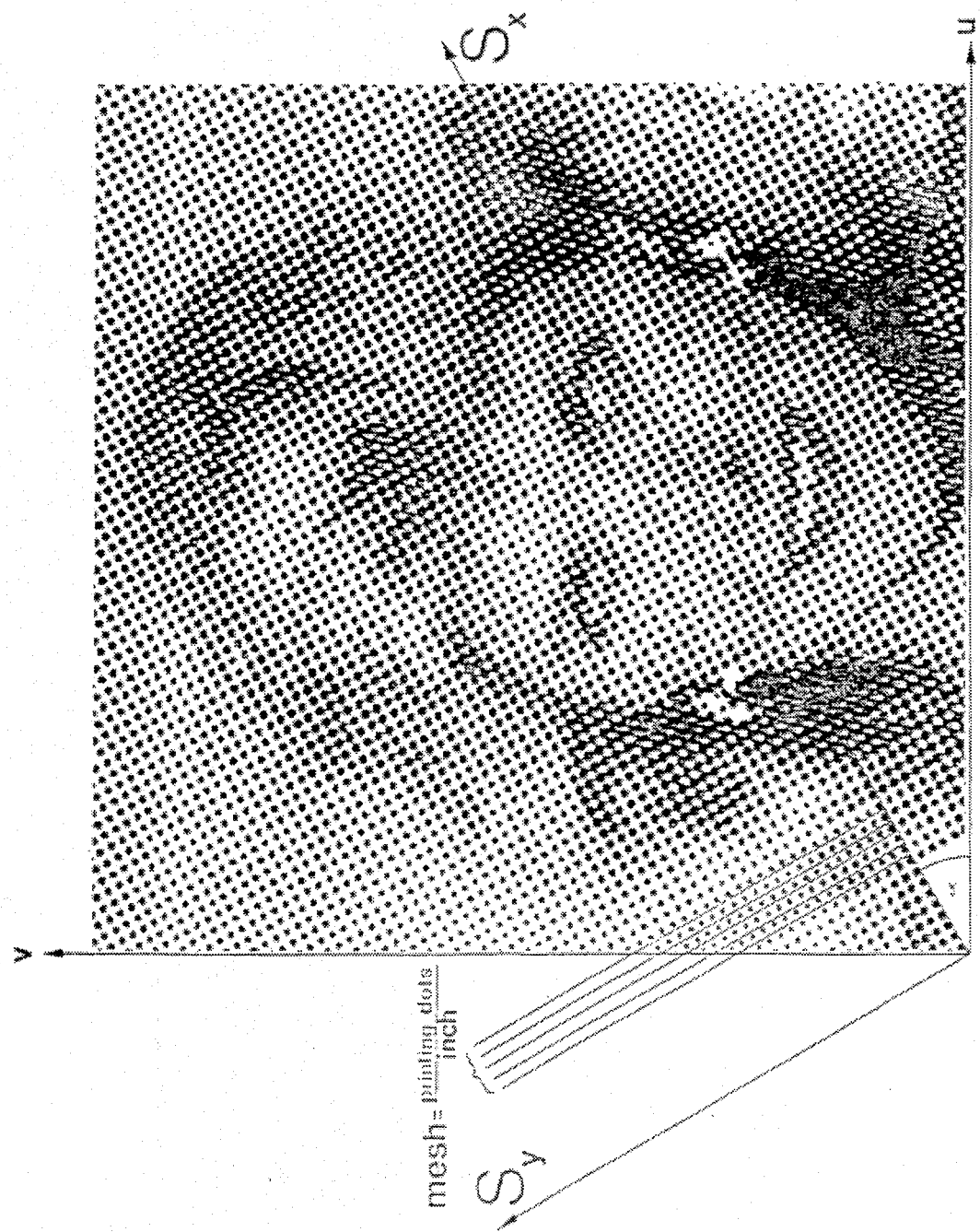
FIG. 15 is an output screened image produced according to the present invention.

FIG. 15 illustrates a screened halftone color separation produced in accordance with a preferred embodiment of the present invention. It is appreciated that the operator, using workstation 16, defines the screen rotation angle and the mesh of the output screen dots.

It will be appreciated by persons skilled in the art that the present invention is not limited by what has been particularly shown and described hereinabove. Rather the scope of the present invention is defined only by the claims which follow:

We claim:

1. A technique employing a plotter having a beam of variable intensity for generating a screened reproduction of an image including the steps of:

providing a representation of an original containing information representing the input density values of the image;

storing information in a screen memory; and exposing a recording medium to record the screened reproduction of the image, the step of exposing including the step of:

employing information stored in the screen memory and information representing the input density values of the image to determine non-arithmetically whether and at what intensity a laser is to be operated to expose the recording medium at a given location.

2. A technique according to claim 1 and wherein said step of employing information operates in real time.

3. A technique according to claim 1 and wherein the step of employing information operates during exposure.

4. A technique according to claim 1 and wherein said step of employing utilizes a collection of values to determine whether and at what intensity a laser is to be operated to expose the recording medium at a given location.

5. A technique according to claim 4 and wherein said collection of values includes values representing beam intensities.

6. A technique according to claim 1 and also comprising the step of employing a modulation LUT to receive at least the collection of values for governing the operation of the laser.

7. Apparatus employing a plotter having a beam of variable intensity for generating a screened reproduction of an image including:

means for providing a representation of an original containing information representing the input density values of the image;

means for storing information in a screen memory; and means for exposing a recording medium to record the screened reproduction of the image, said means for exposing including:

means for employing information stored in the screen memory and information representing the input density values of the image to determine non-arithmetically whether and at what intensity a laser is to be operated to expose the recording medium at a given location.

8. Apparatus according to claim 7 and wherein said means for employing information operates in real time.

9. Apparatus according to claim 7 and wherein said means for employing information operates during exposure.

10. Apparatus according to claim 7 and wherein said means for employing utilizes a collection of values to determine whether and at what intensity a laser is to be operated to expose the recording medium at a given location.

11. Apparatus according to claim 10 and wherein said collection of values includes values representing beam intensities.

12. Apparatus according to claim 7 and also comprising a modulation LUT to receive at least the collection of values for governing the operation of the laser.

13. A technique employing a plotter having a beam of variable intensity for generating a screened reproduction of an image including the steps of:

providing a representation of an original containing input density information representing the input density values of the image;

storing screen memory information in a screen memory; and exposing a recording medium to record the screened reproduction of the image, the step of exposing including the step of:

employing the input density information to distinguish between a central region of a printing dot and a peripheral region thereof; and determining whether and at what intensity a laser is to be operated to expose the recording medium at a given location in the printing dot using the input density information and the screen memory information and applying thereto different criteria for the central region and the peripheral region.

14. A technique employing a plotter for generating a screened reproduction of an image according to claim 13 and wherein a change in the input density causes a change in the intensity of exposure of less than all of the partially exposed printing dot elements.

15. A technique employing a plotter for generating a screened reproduction of an image including the steps of:

providing a representation of an original containing input density information representing the input density values of the image;

storing screen memory information in a screen memory; and exposing a recording medium to record the screened reproduction of the image, the step of exposing including the steps of:

employing the input density information to distinguish between a central region of a printing dot and a peripheral region thereof; and determining whether and where a laser exposes the recording medium using the input density information and the screen memory information and applying thereto different criteria for the central region and the peripheral region.

16. A technique employing a plotter for generating a screened reproduction of an image according to claim 15 and wherein a change in the input density causes a change in the intensity of exposure of less than all of the partially exposed printing dot elements.

17. A technique employing a plotter for generating a screened reproduction of an image including the steps of:

providing a representation of an original containing information representing the input density values of the image;

providing a plurality of functions which are employed in the construction of a screen dot; and employing said plurality of functions and said information representing the input density values of the image to produce a screened reproduction of the image, wherein at least one of said plurality of functions is employed to determine the operational characteristics of at least another one of said plurality of functions.

18. A technique according to claim 17 and wherein said step of determining the operational characteristics includes limiting the extent of the validity of an operation performed employing at least another one of said plurality of functions.

19. A technique according to claim 17 and wherein said at least one of said plurality of functions has a plurality of values.

20. A technique employing a plotter for generating a screened reproduction of an image including the steps of:

providing a representation of an original containing input density information representing the input density values of the image; and exposing a recording medium to record the screened reproduction of the image, the step of exposing including the steps of:

compensating for quantization errors at the subdot level to generally eliminate dot offset.

21. A technique according to claim 20 and wherein said step of compensating includes the step of varying the intensity of exposure of said laser as a function of laser position relative to the desired periphery of a printing dot.

22. A technique employing a plotter for generating a screened reproduction of an image including the steps of:

providing a representation of an original containing information representing the input density values of the image; and exposing a recording medium to record the screened reproduction of the image, the step of exposing including the steps of: grouping input densities into groups;

thresholding a group of input densities to provide a threshold passage indication;

employing both the threshold passage indication and information derived from the input density to determine how to expose the recording medium at a given location.

23. A technique according to claim 22 and wherein:

the step of grouping comprises grouping input densities into predetermined groups.

24. A technique according to claim 22 and wherein:

said step of grouping comprises employing a single operating value to represent a multiplicity of input densities; and said step of thresholding comprises thresholding said operating value to provide said threshold passage indication.

25. A technique according to claim 22 and wherein:

said step of grouping comprises the step of mapping a plurality of input densities into an operating value; and said step of thresholding comprises the step of operating with a threshold on the operating value to provide said threshold passage indication.

26. Apparatus employing a plotter having a beam of variable intensity for generating a screened reproduction of an image comprising:

means providing a representation of an original containing input density information representing the input density values of the image;

a screen memory for storing screen memory information; and a plotter, exposing a recording medium to record the screened reproduction of the image, the plotter including:

means for employing the input density information to distinguish between a central region of a printing dot and a peripheral region thereof; and means for determining whether and at what intensity a laser is to be operated to expose the recording medium at a given location in the printing dot using the input density information and the screen memory information and applying thereto different criteria for the central region and the peripheral region.

27. Apparatus employing a plotter for generating a screened reproduction of an image according to claim 26 and wherein a change in the input density causes a change in the intensity of exposure of less than all of the partially exposed printing dot elements.

28. Apparatus employing a plotter for generating a screened reproduction of an image comprising:

means for providing a representation of an original containing input density information representing the input density values of the image;

a screen memory storing screen memory information; and a plotter exposing a recording medium to record the screened reproduction of the image, the plotter including:

means for employing the input density information to distinguish between a central region of a printing dot and a peripheral region thereof; and means for determining whether and where a laser exposes the recording medium using the input density information and the screen memory information and applying thereto different criteria for the central region and the peripheral region.

29. Apparatus employing a plotter for generating a screened reproduction of an image comprising:

means for providing a representation of an original containing information representing the input density values of the image;

means for providing a plurality of functions which are employed in the construction of a screen dot, wherein at least one of said plurality of functions is employed to determine the operational characteristics of at least another one of said plurality of functions; and means for employing said plurality of functions and said information representing the input density values of the image to produce a screened reproduction of the image.

30. Apparatus according to claim 29 and wherein said step of determining the operational characteristics includes limiting the extent of the validity of an operation performed employing at least another one of said plurality of functions.

31. Apparatus according to claim 29 and wherein said at least one of said plurality of functions has a plurality of values.

32. Apparatus employing a plotter for generating a screened reproduction of an image including:

means for providing a representation of an original containing input density information representing the input density values of the image;

a screen memory storing screen memory information; and a plotter, exposing a recording medium to record the screened reproduction of the image, the plotter including:

means for compensating for quantization errors at the subdot level to generally eliminate dot offset.

33. Apparatus according to claim 32 and wherein said means for compensating includes the step of varying the intensity of exposure of said laser as a function of laser position relative to the desired periphery of a printing dot.

34. Apparatus employing a plotter for generating a screened reproduction of an image comprising:

means for providing a representation of an original containing information representing the input density values of the image; and a plotter, exposing a recording medium to record the screened reproduction of the image, the plotter comprising:

means for grouping input densities into groups;

means for thresholding a group of input densities to provide a threshold passage indication; and means for employing both the threshold passage indication and information derived from the input density to determine how to expose the recording medium at a given location.

35. Apparatus according to claim 34 and wherein:

the means for grouping comprises means for grouping input densities into predetermined groups.

36. Apparatus according to claim 35 and wherein:

said means for grouping comprises means for mapping a plurality of input densities into an operating value; and said means for thresholding comprises means for operating with a threshold on the operating value to provide said threshold passage indication.

37. Apparatus according to claim 34 and wherein:

said means for grouping comprises means employing a single operating value to represent a multiplicity of input densities; and said means for thresholding comprises means for thresholding said operating value to provide said threshold passage indication.

\* \* \* \* \*